(12) United States Patent
Roy

(10) Patent No.: US 8,141,602 B2
(45) Date of Patent: Mar. 27, 2012

(54) ROTATION SYSTEM FOR A FELLING HEAD

(75) Inventor: Normand Roy, Amos (CA)

(73) Assignee: Usinage GN Roy Inc., Amos (Quebec) (CA)

(*) Notice: Subject to any disclaimer, the term of this patent is extended or adjusted under 35 U.S.C. 154(b) by 262 days.

(21) Appl. No.: 12/563,323

(22) Filed: Sep. 21, 2009

(65) Prior Publication Data
US 2010/0071808 A1 Mar. 25, 2010

Related U.S. Application Data

(60) Provisional application No. 61/098,492, filed on Sep. 19, 2008.

(51) Int. Cl.
A01G 23/08 (2006.01)

(52) U.S. Cl. ........................ 144/4.1; 144/34.1

(58) Field of Classification Search ............ 144/4.1, 144/34.1, 34.5, 335, 336, 338; 414/680, 414/729, 739, 695, 695.7, 694; 83/928; 30/379, 30/379.5
See application file for complete search history.

(56) References Cited

U.S. PATENT DOCUMENTS

| 4,005,894 | A | 2/1977 | Tucek |
| 5,101,872 | A | 4/1992 | Scheuren |
| 5,408,814 | A | 4/1995 | Milbourn |
| 5,441,090 | A | 8/1995 | Hill et al. |
| 5,553,993 | A | 9/1996 | Gilbert et al. |
| 5,590,699 | A | 1/1997 | Gilbert et al. |
| 5,595,225 | A | 1/1997 | Gilbert et al. |
| 5,727,610 | A | 3/1998 | Isley |
| 5,908,060 | A * | 6/1999 | Fargeot .................... 144/4.1 |
| 5,957,177 | A | 9/1999 | Smith et al. |
| 5,975,166 | A | 11/1999 | MacLennan |
| 6,123,124 | A | 9/2000 | Naud |
| 6,435,235 | B1 | 8/2002 | Hicks |
| 6,516,841 | B1 | 2/2003 | Oilund |
| 7,296,602 | B1 | 11/2007 | Riha et al. |

FOREIGN PATENT DOCUMENTS

| CA | 2146719 A1 | 10/1996 |
| CA | 2165026 A1 | 10/1996 |
| CA | 2186798 A1 | 3/1998 |
| CA | 2188057 A1 | 4/1998 |
| CA | 2115280 C | 4/1999 |
| CA | 2242538 A1 | 4/1999 |
| CA | 2242625 A1 | 1/2000 |
| CA | 2165028 C | 2/2000 |
| CA | 2291409 A1 | 3/2000 |
| CA | 2305863 A1 | 10/2001 |
| CA | 2546814 A1 | 11/2007 |

* cited by examiner

Primary Examiner — Shelley Self
(74) Attorney, Agent, or Firm — Fish & Richardson P.C.

(57) ABSTRACT

A rotation system for a felling head mounted to a boom, the rotation system including: an adapter which is pivotally mounted to the boom; a housing fixed to the adapter; a gear system enclosed between the housing and the felling head and operable to allow the felling head to rotate with respect to the housing about an axis of rotation; and a plurality of actuators mounted to the housing and engaging the gear system, the plurality of actuators being operable to drive the rotation of the felling head, the plurality of actuators engaging the gearing system at positions below the axis of rotation so as to provide a vertical support therefor.

11 Claims, 4 Drawing Sheets

ROTATION SYSTEM FOR A FELLING HEAD

FIELD OF THE INVENTION

The present invention relates to rotation systems and the like. More particularly, and in its preferred intended use, the present invention relates to a rotation system for a felling head.

BACKGROUND OF THE INVENTION

Tree felling devices and the like are very well known in the art.

Felling heads are typically mounted at the end of a boom, which itself extends from a tractor, loader or other heavy vehicle. The felling head is usually used to restrain, sever and pile trees prior to further processing.

It is also known in the art to provide a rotation system between the felling head and the outer extremity of the boom in order to enable the felling head to pivot with respect to the tractor. These rotation systems typically comprise a rotational joint and one or more actuators for driving the rotation of the felling head. Also known in the art are the various disadvantages associated with these types of conventional rotation systems.

Known in the art are the following patents and published applications which relate to felling heads and the like: CA 2,115,280, CA 2,146,719, CA 2,165,026, CA 2,165,028, CA 2,186,798, CA 2,188,057, CA 2,242,538, CA 2,242,625, CA 2,291,409, CA 2,305,863, CA 2,546,814, U.S. Pat. No. 4,005,894, U.S. Pat. No. 5,101,872, U.S. Pat. No. 5,408,814, U.S. Pat. No. 5,441,090, U.S. Pat. No. 5,595,225, U.S. Pat. No. 5,727,610, U.S. Pat. No. 5,908,060, U.S. Pat. No. 5,975,177, U.S. Pat. No. 5,975,166, U.S. Pat. No. 6,123,124, U.S. Pat. No. 6,435,235, U.S. Pat. No. 6,516,841 and U.S. Pat. No. 7,296,602.

However, it would be advantageous to provide an improved rotation system with an improved structure and/or operability. There is a need for a device or a system which, by virtue of its design and components, would be able to overcome some of the problems associated with prior art designs.

SUMMARY OF THE INVENTION

An aspect of the present invention is to provide a rotation system which, by virtue of its design and components, satisfies at least some of the above-mentioned needs and is thus an improvement over other related devices and systems known in the prior art.

According to an aspect of the present invention, there is provided a rotation system for a felling head mounted to a boom, the rotation system including:
a) an adapter which is pivotally mounted to the boom;
b) a housing fixed to the adapter;
c) a gear system enclosed between the housing and the felling head and operable to allow the felling head to rotate with respect to the housing about an axis of rotation; and
d) a plurality of actuators mounted to the housing and engaging the gear system, the plurality of actuators being operable to drive the rotation of the felling head, the plurality of actuators engaging the gearing system at positions below the axis of rotation so as to provide a vertical support therefore.

Preferably the plurality of actuators includes a plurality of pinions driven by at least one motor and the plurality of pinions are located below the axis of rotation of the system.

BRIEF DESCRIPTION OF THE DRAWINGS

The invention will be better understood upon reading the following non-restrictive description of the preferred embodiment thereof, made with reference to the accompanying drawings in which.

While the invention will be described in conjunction with example embodiments, it will be understood that it is not intended to limit the scope of the invention to such embodiments. On the contrary, it is intended to cover all alternatives, modifications and equivalents.

DETAILED DESCRIPTION OF PREFERRED EMBODIMENTS OF THE INVENTION

In the following description, the same numerical references refer to similar elements. The embodiments shown in the figures are preferred, for exemplification purposes only.

Figure 1:
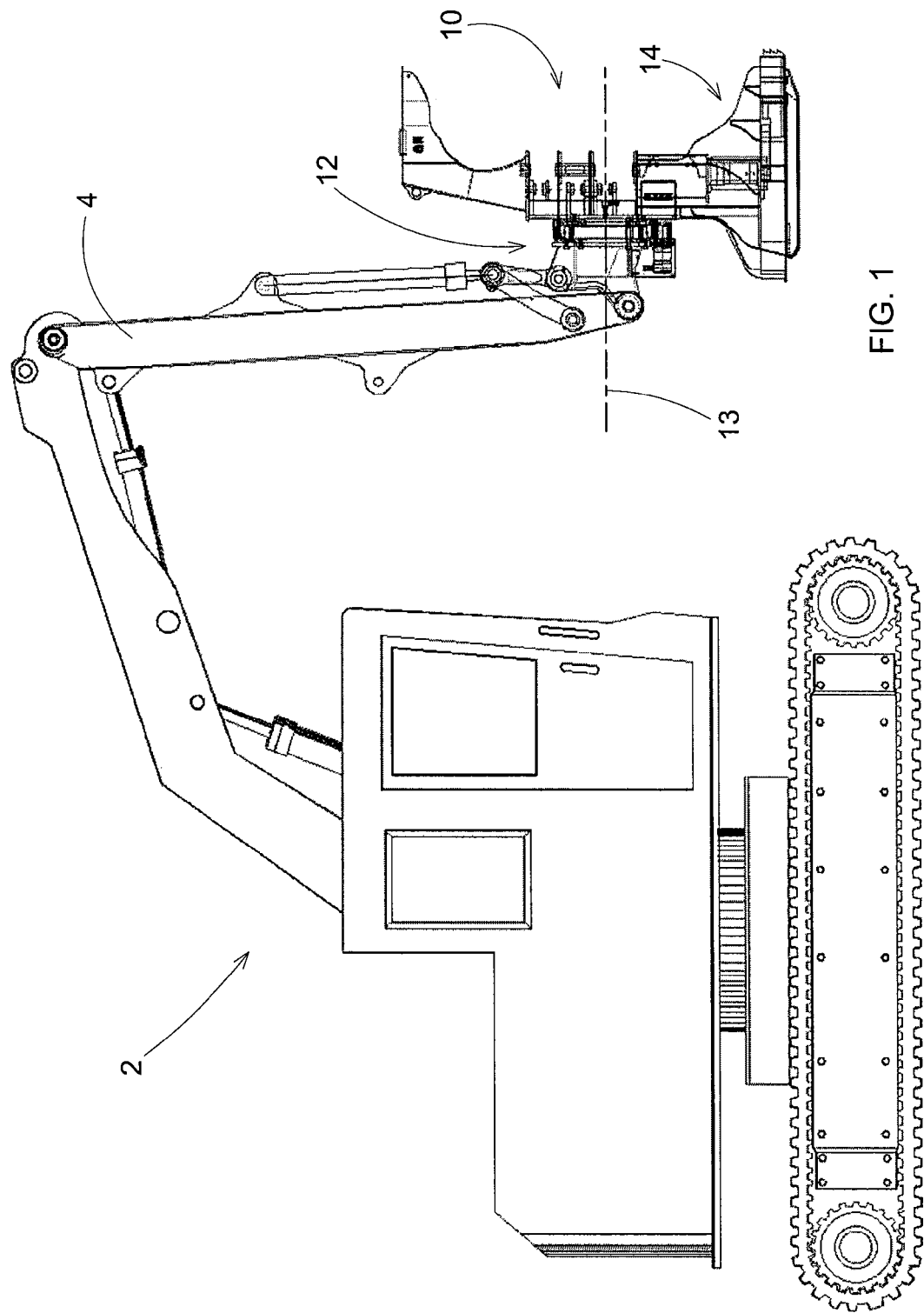
FIG. 1 is a side view of a tree-felling vehicle in accordance with an aspect of the present invention.

With reference to FIG. 1, a tree-felling vehicle 2 is provided with a felling head 10 which is mounted at the end of a boom 4 via a rotation system 12. The felling head 10 is operable to hold a tree trunk while a saw (not shown) housed within a cutting portion 14 severs the tree trunk. The rotation system 12 enables the felling head 10 to tilt about an axis of rotation 13 in a clockwise or counter-clockwise direction 15 (see FIG. 3a) with respect to the vehicle 2 and the boom 4.

Typically, the rotation of the felling head 10 about the axis 13 is limited to a predetermined maximum angular displacement. This limiting can be accomplished by a mechanical stopper 17.

Figure 2:
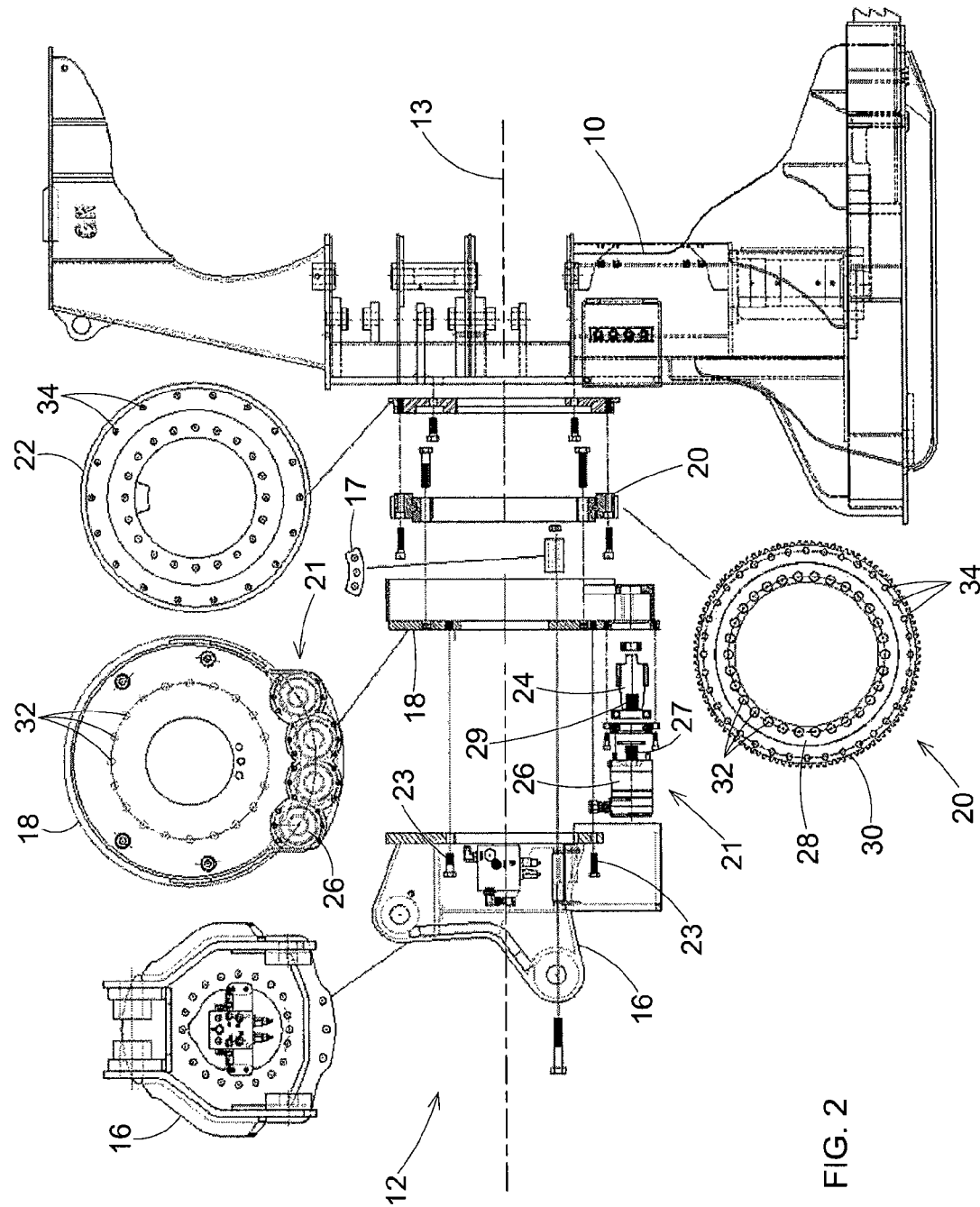
FIG. 2 is an exploded view of the rotation system and felling head illustrated in FIG. 1.

The rotation system 12 comprises four main elements, which are illustrated in FIG. 2 both in profile and from the front. These are an adapter 16, a housing 18, a gear system 20 and a plurality of actuators 21.

Figures 3A, 3B:
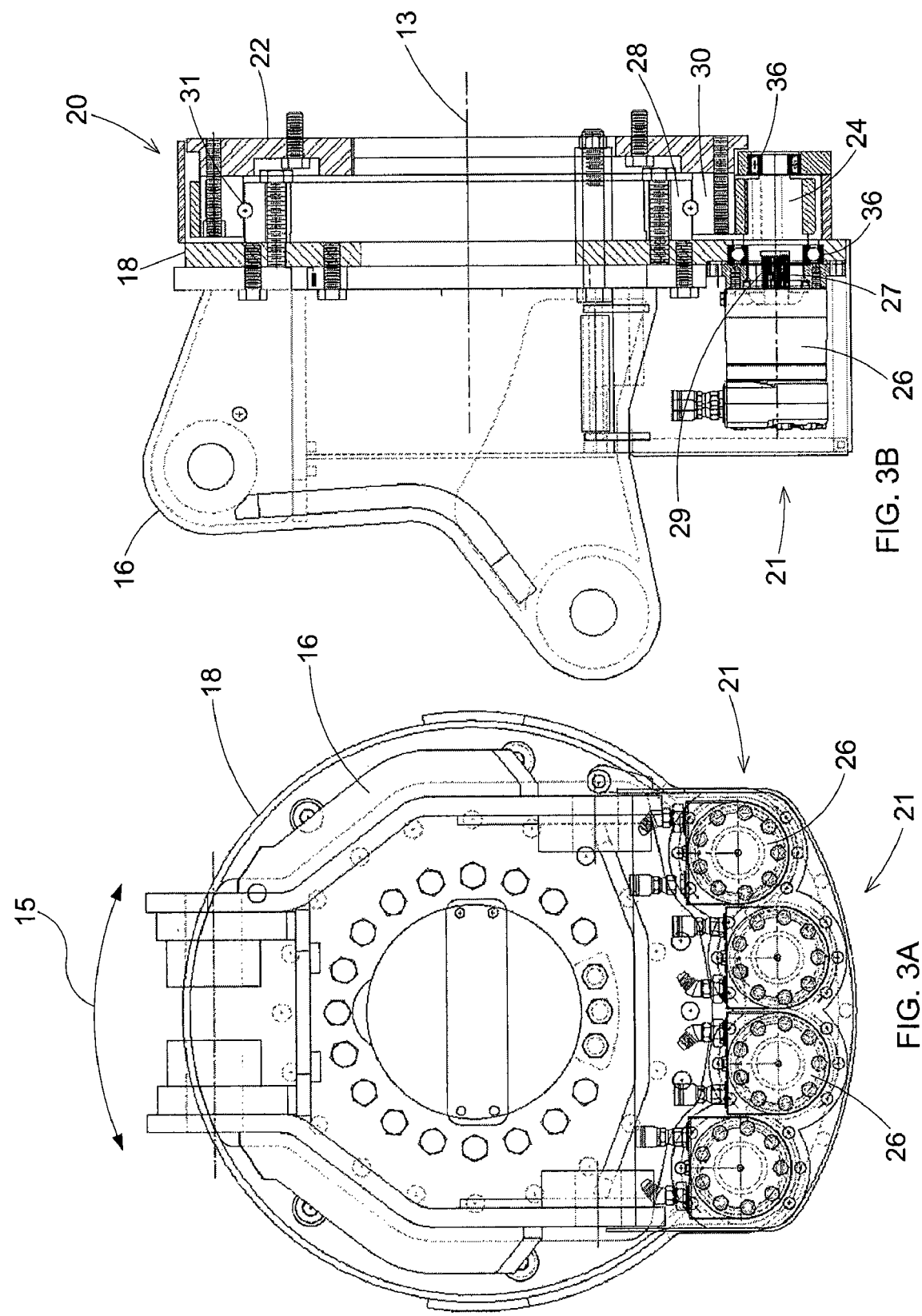
FIGS. 3A and 3B are unexploded front and side views of the rotation system illustrated in the previous figures.

With additional reference to FIGS. 3A and 3B, the adapter 16 is pivotally mounted to the boom 4, as is common in the art. The housing 18 is then fixed to the adapter 16 via an attachment means 23, preferably via a releasable attachment means such as a plurality of bolts 23 illustrated, and encloses the gear system 20 with a plate 22. The plurality of actuators 21 are mounted to the housing 18 and drive the gear system 20, and thereby the rotation of the felling head.

Preferably, the adapter 16 and housing 18 are arranged such that the bolts 23 which fix the former to the latter are accessible to a user. In this manner, these attachment means may be undone thereby enabling convenient removal of the felling head 10, along with the gear system 20 and the housing 18, from the adapter 16.

The plate 22 allows the rotation system 12 to be used in conjunction with a variety of felling heads 10. Specifically, a variety of plates 22 may be made available having differing bolt-hole patterns in order to adapt to a corresponding variety of felling heads 10.

Preferably, the actuators 21 comprise a plurality of pinions 24 which are directly driven by a corresponding plurality of motors 26, that is to say that each pinion 24 is mounted directly to a motor 26. Preferably, the motors 26 each comprise an output shaft having external splines 27 and the pinions comprise a corresponding set of internal splines 29 for receiving the output shaft.

The rotation system 12 illustrated in the figures comprises four pinion 24 and motor 26 pairs, although it will be appreciated that less or more could be provided. In particular, another embodiment of the present invention comprises three pinion 24 and motor 26 pairs.

Furthermore, it will be appreciated that the number of motors 26 does not necessarily need to correspond exactly with the number of pinions 24, i.e. a single motor 26 could drive more than one pinion 24. It may also be desirable to provide additional gearing between the motors 26 and the pinions 24. It will also be appreciated that various alternative embodiments of the actuators 21 are similarly within the scope of the invention.

The gear system 20 preferably comprises an annular inner portion 28 which is fixed to the inside of the housing 18 and a concentric outer portion 30 which is operable to rotate with respect to the inner portion 28. The outer portion 30 comprises a set of outwardly extending gear teeth which engage the corresponding gears of the pinions 24. The outer portion 30 may also be referred to as a slewing ring.

The rotation within the gear system 20 is enabled by a bearing assembly 31 provided between the inner and outer portions 28 and 30. In the embodiment illustrated, the bearing assembly 31 comprises ball bearings retained between the inner and outer portions 28 and 30 in suitable grooves. As such, the inner and outer portions 28 and 30 are similar to the inner and outer races of a bearing and the inner portion 28 may also be referred to as bearing seat. It will be appreciated that various alternative bearing assemblies could be used to enable the rotation of the gear system 20, in its preferred embodiment or otherwise, including but not limited to rolling element bearings or journal bearings.

The inner portion 28 is fixed to the housing 18 via two corresponding sets of attachment points 32. The outer portion 30, for its part, is fixed to the plate 22 via another two corresponding sets attachment points 34. The plate 22 is in turn fixed to the body of the felling head 10.

As such, the felling head 10, plate 22 and the outer portion 30 of the gear system 20 are operable to rotate about the inner portion 28, the housing 18 and the adapter 16. When assembled, the pinions 24 engage the outer portion 30 of the gear system 20 such that the motors 26 are operable to drive the rotation of the plate 22 and the felling head 10.

It will be noted that the gear system 20 illustrated herein may be provided in a number of other variations. Instead of being provided with outer and inner portions 28 and 30, a more complex gear system 20 comprising multiple stages could also be provided.

When viewed from the front, as seen in FIG. 3a, the pinion gears 24 are mounted on a lower portion of the adapter 16, below the axis of rotation 13 of the system 12, so as to engage the gear system 20 from underneath. Preferably, the pinions 24 are doubly supported by the housing 18 at 36. This arrangement advantageously provides vertical support for the felling head 10 since the gear system 20 will sit upon the pinion gears 24, as well as a degree of horizontal support since the two outer pinions 24 will restrain the gear system 20 laterally.

It will also be appreciated that by positioning the actuators 21 below the axis of rotation 13 conveniently keeps these elements out of the operator's line of sight.

In addition, conventional felling heads and rotation systems do not typically provide a housing for the gear system which is a distinct from the adapter. Typically, the adapter and housing form a single member and the motors and gear system necessary to rotate the felling head are mounted to this member. As a result, in order to remove a felling head from a boom, the entire rotation system, adapter and all, must be disassembled at the end of the boom. This can be quite complex and time consuming, especially given that the removed felling head may often be replaced by another felling head of a different size.

In contrast, the rotation system 12 provides a housing 18 within which the gear system 20 is mounted, and onto which the motors 26 are directly attached, which is both distinct and detachable from the adapter 16. As such, when an operator wishes to replace the felling head 10, the housing 18 can simply be unbolted from the adapter and the gear system 20, pinions 24 and motors 26 come with it.

Figure 4:
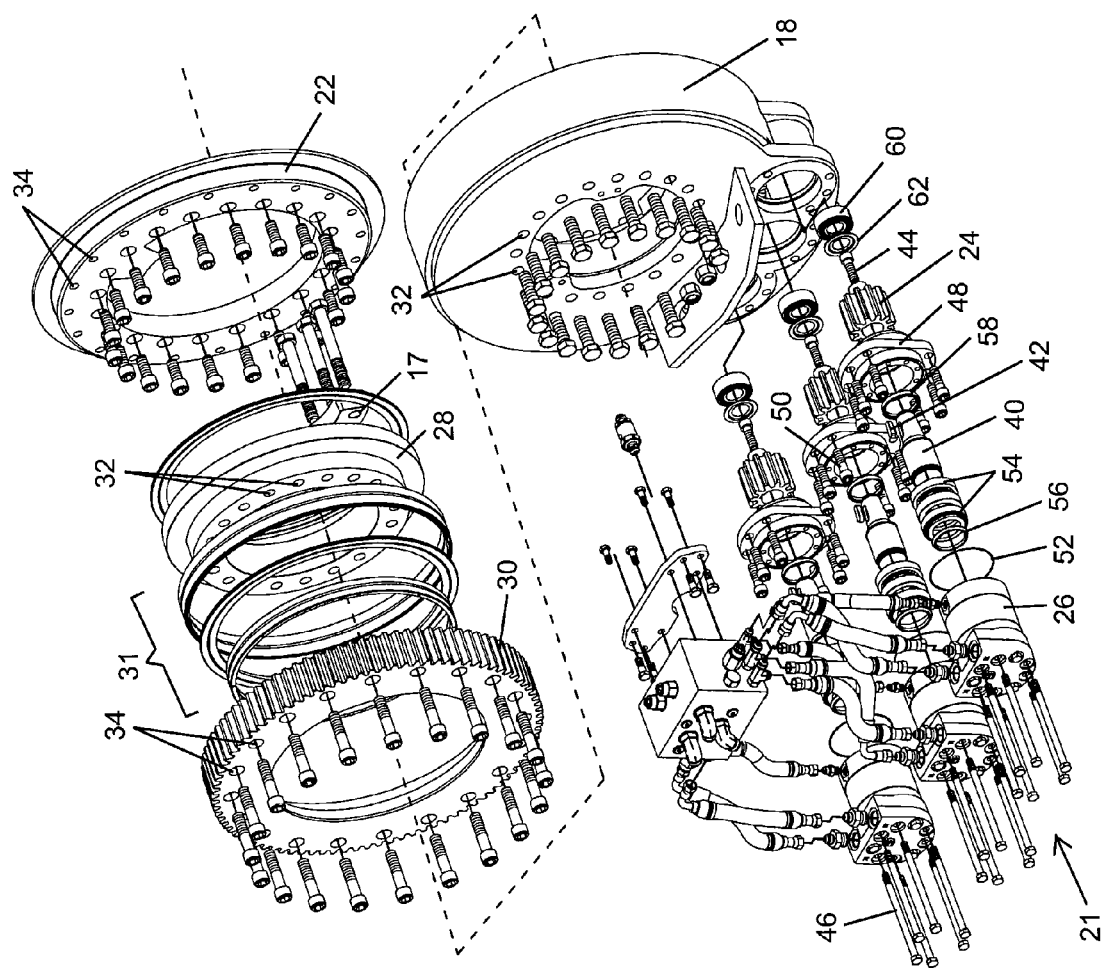
FIG. 4 is an exploded perspective view of a rotation system in accordance with another preferred embodiment of the present invention.

With reference to FIG. 4, another embodiment of the rotation system 10 is illustrated. This alternate embodiment differs in the constructions of the actuators 21. Specifically, instead of providing pinions 24 with internal splines 29 for receiving the external splines 27 of the output shaft, a tapered shaft 40 is provided for connecting each motor 26 to its respective pinion 24.

For each actuator 21, the output shaft of the motor 26 is received inside a corresponding recess in the tapered shaft 40. The shaft 40 further comprises a slot for receiving a key 42 which engages a corresponding keyway within the pinion 24. The pinion 24 is then fixed to the shaft 40 by a bolt 44.

Bolts 46 fix the motor 26 to a flange 48 which itself is fixed to the housing 18 via bolts 50. Preferably, an O-ring 52 is disposed between the motor 26 and the flange 48. A pair of bearings 54 are disposed between the flange 48 and the shaft 40 proximate the output shaft of the motor 26, preferably with the addition of a thrust washer 56 and a seal 58. Another bearing 60, preferably in conjunction with a protector 62, is disposed between the housing 18 and the pinion 24 at the extremity of the shaft 40—pinion 24 pair which is opposite the motor 26.

Of course, numerous modifications could be made to the above-described embodiments without departing from the scope of the invention, as apparent to a person skilled in the art.

The invention claimed is:

1. A rotation system for rotating a felling head, the rotation system being mounted between the felling head and a boom and comprising:
   a) an adapter which is pivotally mounted to the boom;
   b) a housing fixed to the adapter;
   c) a gear system mounted within the housing and connected to the felling head, the gear system being operable to allow the felling head to rotate with respect to the housing about an axis of rotation; and
   d) a plurality of actuators mounted to the housing and engaging the gear system, the plurality of actuators engaging the gearing system at positions below the axis of rotation so as to drive the rotation of the felling head and so as to provide a vertical support therefore.

2. The rotation system of claim 1, wherein the plurality of actuators comprises a plurality of pinions driven by at least one motor, the plurality of pinions being located below the axis of rotation of the rotation system.

3. The rotation system of claim 2, wherein each pinion is directly driven by a corresponding motor.

4. The rotation system of claim 2, wherein the gear system further comprises:
   a) an inner portion which is fixed to the housing; and
   b) an annular outer portion which is concentric to the inner portion and operable to rotate therearound, the annular outer portion being fixed to the felling head and comprising outwardly extending gear teeth which engage the plurality of pinions.

5. The rotation system of claim 4, wherein the gear system further comprises a bearing assembly between the inner and outer portions.

6. The rotation system of claim 2, wherein the gear system comprises multiple stages.

7. The rotation system of claim 2, wherein the pinions are doubly supported by the housing.

8. The rotation system of claim 1, wherein the plurality of actuators is four actuators.

9. The rotation system of claim 1, wherein the housing is detachable from the adapter.

10. The rotation system of claim 9, further comprising bolts which fix the housing to the adapter, the bolts being accessible to a user.

11. The rotation system of claim 1, further comprising an annular plate mounted between the gear system and the felling head, the plate and the housing enclosing the gear system.

* * * * *